(12) United States Patent
Modahl

(10) Patent No.: US 6,361,710 B1
(45) Date of Patent: Mar. 26, 2002

(54) ABSORBENT REFRIGERANT COMPOSITION

(75) Inventor: Robert James Modahl, Galesville, WI (US)

(73) Assignee: Gas Research Institute, Des Plaines, IL (US)

( * ) Notice: Subject to any disclaimer, the term of this patent is extended or adjusted under 35 U.S.C. 154(b) by 0 days.

(21) Appl. No.: 08/233,468

(22) Filed: Apr. 26, 1994

(51) Int. Cl.$^7$ ................................................. C09K 5/04
(52) U.S. Cl. .............................. 252/69; 252/67; 62/112
(58) Field of Search .................... 252/69, 67; 62/112

(56) References Cited

U.S. PATENT DOCUMENTS

| | | | |
|---|---|---|---|
| 3,478,530 A | * 11/1969 | Aronson | 62/112 |
| 4,614,605 A | 9/1986 | Erickson | 252/69 |
| 4,724,679 A | 2/1988 | Radermacher | 62/101 |
| 4,732,008 A | 3/1988 | DeVault | 62/79 |
| 4,745,768 A | 5/1988 | Schorr et al. | 62/238.6 |
| 4,857,222 A | * 8/1989 | Itoh et al. | 252/69 |
| 5,108,638 A | 4/1992 | Iizuka et al. | 252/69 |
| 5,186,009 A | * 2/1993 | Rockenfeller | 62/112 |

FOREIGN PATENT DOCUMENTS

| | | | |
|---|---|---|---|
| GB | 2103641 | * | 2/1983 |
| JP | 61-64781 | * | 4/1986 |
| WO | 93/11393 | * | 6/1993 |

OTHER PUBLICATIONS

Adegoke, "Solubility of the water—lithium bromide—zinc bromide combination", AN 119:195100, 1993.*

Modahl et al., Evaluation of a Commercial Advanced Absorption Heat Pump Breadboard, 1988, pp. 117–125.

* cited by examiner

Primary Examiner—Margaret Einsmann
(74) Attorney, Agent, or Firm—Mark E. Fejer

(57) ABSTRACT

An absorbent refrigerant composition containing an aqueous solution of zinc and lithium bromides with an added amount of hydroxide ions. The addition of the hydroxide ions lowers the corrosion rate of the composition to an acceptable level without raising the freeze point of the composition. The composition is particularly suitable for use as an absorbent refrigerant composition in the high temperature loop of a dual loop triple effect absorption refrigeration apparatus.

20 Claims, No Drawings

ABSORBENT REFRIGERANT COMPOSITION

FIELD OF THE INVENTION

This invention relates to absorbent compositions for use with absorption heat exchange apparatus and, particularly, to absorbent compositions which can be used in the high temperature circuit of a dual circuit triple effect heat exchange apparatus.

BACKGROUND OF THE INVENTION

Absorption refrigeration, chilling, heat pump, and related apparatus employing a single refrigeration loop and absorbent refrigerant compositions are well known. The refrigeration loop typically includes a generator, a condenser, an evaporator, and an absorber. Conventional absorbent refrigerant compositions which use water as the refrigerant and lithium bromide as the absorbent can be used in the refrigeration loop.

The principal operation of a single refrigeration loop involves adding heat from an external energy source to the absorbent refrigerant composition in the generator. The generator heats the composition sufficiently to distill out a vapor of the refrigerant, leaving an aqueous composition having a higher concentration of absorbent. The aqueous composition is removed to the absorber and the vapor phase is removed to the condenser. In the condenser, the vapor phase is condensed to form a liquid refrigerant and shed heat. The liquid refrigerant is then re-evaporated in the evaporator using heat from a heat load in direct or indirect contact with the refrigerant. The re-evaporated refrigerant is removed to the absorber where it is absorbed by the aqueous absorbent composition to reform the original absorbent refrigerant composition and shed heat.

Dual loop absorption cycles employing separate but interacting refrigeration circuits of the type described above are also known. One example of a dual loop cycle is disclosed in U.S. Pat. No. 4,732,008.

With the dual loop concept, one circuit, known as the high-temperature loop or circuit, has the condenser and absorber operating at relatively high temperatures so that all of the heat of condensation and absorption from that circuit is transferred to the generator of the second, or low-temperature circuit. The evaporators of both circuits provide cooling to an external heat load. The low temperature circuit operates at conventional water chiller temperature conditions, and lithium bromide/water is the preferred working fluid. However, the single salt lithium bromide is not soluble enough in water to provide a desirably low vapor pressure of the working fluid (about 10 mm Hg) at the high absorber temperatures, e.g. about 190–240° F., (87–115° C.) required in the high temperature circuit.

U.S. Pat. No. 4,732,008 suggests some possible absorption solutions for use as the working fluid in the high temperature circuit. One such absorption solution mixture is a mixture of lithium bromide, water, an anti-crystallization additive (e.g., ethylene glycol), a heat transfer additive and a corrosion inhibitor. Although this absorption solution can function as the working fluid in the high temperature circuit, the ethylene glycol anti-crystallization additive is not stable enough at the high generator temperatures required, e.g. 400° F. (200° C.) or higher, to withstand continuous and repeated cycling through the high temperature circuit. Moreover, the absorption solution exceeds the preferred low vapor pressure of about 10 mm Hg absolute at a temperature of 190–240° F. (87–115° C.).

In order to obtain maximum efficiency of the dual loop absorption circuit, the working fluid for the high temperature circuit should preferably be a liquid in the temperature range of about 190–240° F. (87–115° C.), have a vapor pressure of about 10 mm Hg absolute at the working temperature, and be capable of withstanding temperatures as high as 480–500° F. (249–260° C.). Absorption compositions that can meet these temperature, pressure and solubility requirements include aqueous solutions of lithium, zinc, and calcium bromides and chlorides disclosed generally in U.S. Pat. No. 3,478,530. These salt solutions, however, are unacceptable as working fluids for the high temperature circuit because they are extremely corrosive to the metals from which the high temperature circuit components are manufactured. Typically, such metals include stainless steels that are susceptible to pitting and stress corrosion.

Accordingly, an object of the present invention is to provide an absorption composition that has improved solubility properties that permit use of the composition in the high temperature circuit of a dual loop, absorption refrigeration system.

Another object of the present invention is to provide an absorption composition which does not corrode the high-temperature circuit components.

Another object of the invention is to provide an absorption composition which has a relatively low vapor pressure and is capable of withstanding the high temperatures in the high temperature circuit of a dual loop absorption refrigeration system.

Other objects of the invention will become apparent to one of ordinary skill in the art from consideration of the present disclosure.

SUMMARY OF THE INVENTION

The invention is an absorption composition which is a solution of water, zinc and lithium bromides, and a source of hydroxide ions. The composition contains from about 50 to 60 grams of zinc bromide, and from about 25 to 35 grams of lithium bromide per one hundred grams of the solution, and has a weight ratio of zinc bromide to lithium bromide of about 1.6 to about 1.9. Preferably, the source of hydroxide ions is lithium hydroxide, and the amount of hydroxide (expressed as lithium hydroxide) included in the solution ranges from about 0.0015 to about 0.015 gram per gram of total contained salt. A preferred composition has a weight ratio of zinc bromide to lithium bromide of about 1.75, contains about 0.003 gram of lithium hydroxide per gram of contained salt, and operates in the concentration range of about 80–91 weight percent total salt.

DESCRIPTION OF THE PREFERRED EMBODIMENT

The absorbent refrigerant composition of the present invention employs water as the refrigerant and lithium and zinc bromides and hydroxides as the absorbent. The composition contains from about 50 to about 60 grams of zinc bromide and from about 25 to about 35 grams of lithium bromide per one hundred grams of the composition. The weight ratio of zinc bromide to lithium bromide in the composition is in the range of 1.6 to 1.9, with 1.75 being the preferred weight ratio. Compositions containing zinc bromide to lithium bromide in weight ratios of less than 1.6 are not soluble enough to provide the vapor pressure requirement of 10 mm Hg absolute for the evaporator and absorber sections of the high temperature circuit at the high temperatures required in the absorber section, and solubility is adversely affected by the addition of hydroxide. Compositions containing zinc bromide to lithium bromide in weight ratios of greater than 1.9 are too viscous to be suitable for practical use.

A small amount of hydroxide is included in the absorbent refrigerant composition to reduce the corrosivity of the composition. Without the addition of hydroxide, the zinc and lithium bromide solution exhibits acidity and a strong corrosive action on stainless steels, which is undesirable since it reduces the life of the absorption refrigeration equipment. When hydroxide is added to the composition, the pH of the composition is raised to an acceptable level (i.e. well above the methyl orange end point of about 4.3) and the corrosion rate is reduced, making the absorbent refrigerant composition desirable for use in the high temperature circuit of a dual loop, triple effect system.

The preferred hydroxide for use in the absorbent refrigerant composition is lithium hydroxide, although zinc hydroxide or a combination of zinc and lithium hydroxides can also be used as the hydroxide. The amount of the hydroxide added is from 0.0015 to 0.015 gram (expressed as lithium hydroxide) per gram of total salt contained in the composition. The term "total salt" refers to the combined amount, in grams, of zinc bromide and lithium bromide present in the composition. The salts and the hydroxide are dissolved in the refrigerant, i.e. water, to make the absorbent refrigerant composition.

That hydroxide ions can be used in a composition containing dissolved zinc bromide and lithium bromide is surprising, since hydroxides are not very soluble and their addition to zinc bromide and/or lithium bromide compositions usually raises the freeze point of the compositions and results in the generation of precipitates. This tendency to generate precipitates is confirmed in U.S. Pat. No. 5,108,638, which teaches that the addition of lithium hydroxide to an aqueous solution of lithium and calcium bromides resulted in the formation of undesirable precipitates. Precipitation formation, or crystallization, is undesirable because the precipitates plug the absorption refrigeration apparatus. Precipitation would make the hydroxide unavailable to control corrosion and large amounts of precipitates could plug system heat exchanger passages.

It has been found, however, that a precipitate does not form when a relatively small amount of lithium hydroxide is included in the aqueous solution of zinc and lithium bromides, provided the aqueous solution has a concentration range of about 80–91 weight percent total salt. At more dilute zinc and lithium bromide salt concentrations, the addition of lithium hydroxide results in the formation of precipitates. The formation of precipitates at more dilute concentrations, while the salts remain in solution at the higher concentration range of 80–91 weight percent is contrary to the result one would expect. Generally, the higher the salt concentration, the more likely it is that precipitates will form. Although the exact mechanism preventing the formation of precipitates at high salt concentrations is unknown, it is believed that, at high salt concentrations, the lithium and zinc bromides form complexes that keep the lithium hydroxide in solution.

It has been found that, when calcium is present along with the lithium and zinc bromides, the addition of lithium hydroxide reduces the solubility of the solution, making the composition unsuitable for use as an absorbent refrigerant composition. Thus, the absorbent refrigerant composition of the present invention is preferably essentially free of calcium.

A preferred absorbent refrigerant composition in accordance with the present invention has a weight ratio of zinc bromide to lithium bromide of about 1.75, contains about 0.003 gram of added lithium hydroxide per gram of total contained salts, and operates in the concentration range of about 80–91 weight percent total salts.

The following examples illustrate the practice of the present invention:

EXAMPLE 1 (COMPARATIVE)

An absorbent refrigerant composition is prepared by dissolving 100 grams of lithium bromide, 220 grams of zinc bromide, and 60 grams of calcium bromide in water to make a solution having a weight ratio of the respective salts of 1/2.2/0.6 and a mole ratio of the respective salts of 1.2/1/0.3. The total concentration of salts in the solution is 80 percent by weight. Lithium hydroxide in the amount of 2 grams is added to the aqueous salt solution (0.005 gm lithium hydroxide per gram of total salt). The addition of lithium hydroxide reduces the corrosivity of the composition, but also reduces the solubility of its salts. Doubling the amount of hydroxide by adding another 2 grams (to provide a total of 0.010 gram lithium hydroxide per gram total salt) reduces the solubility of the salts by about 7 percent at the absorber temperature, making the composition unacceptable for use as an absorbent refrigerant composition in the high temperature loop of a dual loop triple effect absorption refrigeration apparatus.

EXAMPLE 2

An absorbent refrigerant composition is prepared by dissolving 100 grams of lithium bromide and 175 grams of zinc bromide in 68.75 grams of water; the weight ratio of zinc bromide to lithium bromide in the solution is 1.75, and the total concentration of salts in the solution is 80 percent by weight. Lithium hydroxide in the amount of 0.003 gram per gram of total salt is added to the solution. The addition of lithium hydroxide in amounts up to 0.015 grams per gram total salt reduces the corrosivity of the composition without reducing the solubility, making the composition acceptable for use as an absorbent refrigerant composition in the high temperature loop of a dual loop triple effect absorption refrigeration apparatus.

EXAMPLE 3

Two corrosion tests were run with identical aqueous salt solution mixtures of 1.75 parts zinc bromide per 1.0 part lithium bromide by weight and 80 percent total salt. The tests were conducted in teflon lined sealed vessels at a constant temperature of 550 F. Each test vessel contained a Sea-Cure (trade name of Trent Tube Co.) stainless steel tube sample of about 1.9 cm diameter and 3.8 cm length. The solution in one test contained 0.003 grams of added lithium hydroxide per gram total salt; the other did not. After 1304 hours, the Sea-Cure tube in the latter solution failed by stress corrosion cracking. After 3242 hours, the Sea-Cure tube in the solution with added lithium hydroxide showed no significant corrosion, demonstrating the effectiveness of the added hydroxide.

It will be understood that various changes and modifications can be made in the above-described embodiment of the invention without departing from the spirit thereof, particularly as defined by the following claims.

What is claimed is:

1. An absorbent refrigerant composition comprising an aqueous solution of zinc bromide and lithium bromide with an added amount of hydroxide, wherein the weight ratio of zinc bromide to lithium bromide in said solution is from about 1.6 to about 1.9, the amount of hydroxide added ranges from about 0.0015 to about 0.015 gram per gram of total contained salt, and the composition is essentially free of calcium.

2. The absorbent refrigerant composition of claim 1, wherein the hydroxide is selected from the group consisting of lithium hydroxide, zinc hydroxide, and mixtures thereof.

3. The absorbent refrigerant composition of claim 1, wherein the weight ratio of zinc bromide to lithium bromide is about 1.75.

4. The absorbent refrigerant composition of claim 2, wherein the solution contains about 0.003 gram lithium hydroxide per gram of total contained salt.

5. The absorbent refrigerant composition of claim 1, wherein the solution has a salt concentration of from about 80 to about 91 weight percent of total salt.

6. An absorbent refrigerant composition consisting essentially of an aqueous solution of zinc bromide and lithium bromide with an added amount of hydroxide, wherein the weight ratio of zinc bromide to lithium bromide in said solution is from about 1.6 to about 1.9, and the amount of hydroxide added ranges from about 0.0015 to about 0.015 gram per gram of total contained salt.

7. The absorbent refrigerant composition of claim 6, wherein the hydroxide is selected from the group consisting of lithium hydroxide, zinc hydroxide, and mixtures thereof.

8. The absorbent refrigerant composition of claim 6, wherein the weight ratio of zinc bromide to lithium bromide is about 1.75.

9. The absorbent refrigerant composition of claim 7, wherein the solution contains about 0.003 gramp lithium hydroxide per gram of total contained salt.

10. The absorbent refrigerant composition of claim 6, wherein the solution has a salt concentration of from about 80 to about 91 weight percent of total salt.

11. A triple effect absorption heat exchange apparatus comprising a high temperature loop which has an absorber operating at a working temperature range of from about 190° F. to about 240° F.; a working fluid in said high temperature loop consisting essentially of an aqueous solution of zinc bromide and lithium bromide with an added amount of hydroxide, wherein the weight ratio of zinc bromide to lithium bromide in said solution is from about 1.6 to about 1.9, and the amount of hydroxide added ranges from about 0.0015 to about 0.015 gram per gram of total contained salt; and a low temperature loop.

12. The triple effect apparatus of claim 11, wherein said absorbent refrigerant composition is essentially free of calcium.

13. The triple effect apparatus of claim 11, wherein the hydroxide is selected from the group consisting of lithium hydroxide, zinc hydroxide, and mixtures thereof.

14. The triple effect apparatus of claim 11, wherein the weight ratio of zinc bromide to lithium bromide is about 1.75.

15. The triple effect apparatus of claim 11, wherein the solution contains about 0.003 gram lithium hydroxide per gram of total contained salt.

16. The triple effect apparatus of claim 11, wherein the solution has a salt concentration of from about 80 to about 91 weight percent of total salt.

17. The absorbent refrigerant composition of claim 1, wherein said working fluid has a vapor pressure of about 10 mm Hg absolute in the temperature range of from about 190° F. to about 240° F.

18. The absorbent refrigerant composition of claim 6, wherein said working fluid has a vapor pressure of about 10 mm Hg absolute in the temperature range of about 190° F. to about 240° F.

19. The triple effect apparatus of claim 11, wherein said working fluid has a vapor pressure of about 10 mm Hg absolute in the temperature range of about 190° F. to about 240° F.

20. The triple effect apparatus of claim 11, wherein said working fluid is capable of withstanding a temperature within the range of from about 480° F. to about 500° F. in the high temperature loop.

\* \* \* \* \*